United States Patent
Clements et al.

(10) Patent No.: US 10,437,865 B1
(45) Date of Patent: Oct. 8, 2019

(54) COMPUTER STORAGE DEDUPLICATION

(75) Inventors: Austin Clements, Arlington, MA (US); Irfan Ahmad, Mountain View, CA (US); Jinyuan Li, Mountain View, CA (US); Murali Vilayannur, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 228 days.

(21) Appl. No.: 12/783,408

(22) Filed: May 19, 2010

Related U.S. Application Data

(63) Continuation-in-part of application No. 12/356,921, filed on Jan. 21, 2009.

(60) Provisional application No. 61/179,612, filed on May 19, 2009.

(51) Int. Cl.
G06F 16/30 (2019.01)

(52) U.S. Cl.
CPC .................................... *G06F 16/30* (2019.01)

(58) Field of Classification Search
None
See application file for complete search history.

(56) References Cited

U.S. PATENT DOCUMENTS

| | | | |
|---|---|---|---|
| 6,075,938 A | 6/2000 | Bugnion et al. | |
| 6,789,156 B1 | 9/2004 | Waldspurger | |
| 6,934,880 B2 | 8/2005 | Hofner | |
| 7,287,131 B1 | 10/2007 | Martin et al. | |
| 7,600,125 B1* | 10/2009 | Stringham | 713/176 |
| 7,734,603 B1 | 6/2010 | McManis | |
| 7,840,537 B2 | 11/2010 | Gokhale et al. | |
| 7,921,077 B2 | 4/2011 | Ting et al. | |
| 8,099,571 B1 | 1/2012 | Driscoll et al. | |
| 8,135,930 B1* | 3/2012 | Mattox et al. | 711/162 |
| 2003/0037022 A1 | 2/2003 | Adya et al. | |
| 2003/0058277 A1* | 3/2003 | Bowman-Amuah | 345/765 |
| 2004/0107225 A1 | 6/2004 | Rudoff | |
| 2005/0033933 A1 | 2/2005 | Hetrick et al. | |
| 2005/0083862 A1* | 4/2005 | Kongalath | 370/299 |
| 2007/0033354 A1* | 2/2007 | Burrows | G06F 17/30085 711/156 |
| 2007/0050423 A1 | 3/2007 | Whalen et al. | |
| 2007/0061487 A1 | 3/2007 | Moore et al. | |
| 2007/0174673 A1* | 7/2007 | Kawaguchi | G06F 11/1458 714/6.12 |

(Continued)

OTHER PUBLICATIONS

William J. Bolosky et al., "Single Instance Storage in Windows 2000", Microsoft Research, USENIX Technical Program, Aug. 2000 pp. 1-12.

(Continued)

*Primary Examiner* — Irete F Ehichioya
*Assistant Examiner* — Johnese T Johnson
(74) *Attorney, Agent, or Firm* — Patterson + Sheridan, LLP

(57) ABSTRACT

Decentralized deduplication operations in a virtualized computer environment having multiple storage devices employ a hash index for each storage device. When an image of a virtual machine is selected to be migrated from a source storage device to a destination storage device, hash values representing content of the storage blocks of the virtual machine are compared with hash entries of the destination hash index. Storage blocks of the virtual machine that have matching hash entries in the destination hash index are not transferred as part of the migration process so that the overall migration process can be accelerated.

19 Claims, 13 Drawing Sheets

(56) References Cited

U.S. PATENT DOCUMENTS

| | | | |
|---|---|---|---|
| 2007/0260815 A1* | 11/2007 | Guha et al. | 711/114 |
| 2008/0005141 A1 | 1/2008 | Zheng et al. | |
| 2008/0005201 A1* | 1/2008 | Ting | G06F 11/1435 |
| 2008/0059726 A1* | 3/2008 | Rozas et al. | 711/156 |
| 2008/0195583 A1* | 8/2008 | Hsu | G06F 17/30477 |
| 2008/0215796 A1* | 9/2008 | Lam | G06F 9/44505 711/100 |
| 2008/0222375 A1* | 9/2008 | Kotsovinos et al. | 711/162 |
| 2008/0235388 A1* | 9/2008 | Fried | G06F 9/5088 709/231 |
| 2008/0294696 A1 | 11/2008 | Frandzel | |
| 2009/0063795 A1 | 3/2009 | Yueh | |
| 2009/0171888 A1 | 7/2009 | Anglin | |
| 2009/0254609 A1 | 10/2009 | Wideman | |
| 2009/0287901 A1 | 11/2009 | Abali | |
| 2010/0042790 A1 | 2/2010 | Mondal et al. | |
| 2010/0057750 A1 | 3/2010 | Aasted | |
| 2010/0070725 A1 | 3/2010 | Prahlad et al. | |

OTHER PUBLICATIONS

John R. Douceur et al., "Reclaiming Space from Duplicate Files in a Serverless Distributed File System", Microsoft Research, Microsoft Corporation, Jul. 2002 Technical Report MSR-TR-2002-30, pp. 1-14.

Bo Hong et al., "Duplicate Data Elimination in a SAN File System", (2004) pp. 101-114.

Koller et al., "I/O Deduplication: Utilizing Content Similarity to Improve I/O Performance," Proceedings of FAST '10: 8th USENIX Conference on File and Storage Technologies, Feb. 26, 2010, pp. 211-224.

Milos, et al., "Satori: Enlightened Page Sharing," Proceedings of 2009 USENIX Technical Conference, Jun. 17, 2009. Also available at <http://www.usenix.org/event/usenix09/tech/full_papers/milos/milos_html/index.html>, visited Aug. 5, 2010.

Sean Quinlan et al., "Venti: a new approach to archival storage", USENIX Association, Proceedings of the FAST 2002 Conference on File and Storage Technologies; Monterey, CA, US, Jan. 28-30, 2002, pp. 1-14.

Benjamin Zhu et al., "Avoiding the Disk Bottleneck in the Data Domain Deduplication File System", USENIX Association, FAST '08: 6th USENIX Conference on File and Storage Technologies, pp. 269-282.

Patent Cooperation Treaty "Notification of Transmittal of International Search Report and the Written Opinion of the International Searching Authority, or the Declaration" mailed in PCT/US2010/035409 dated Sep. 6, 2010.

Distributed Computing, Webopedia.com, Apr. 10, 2001.

* cited by examiner

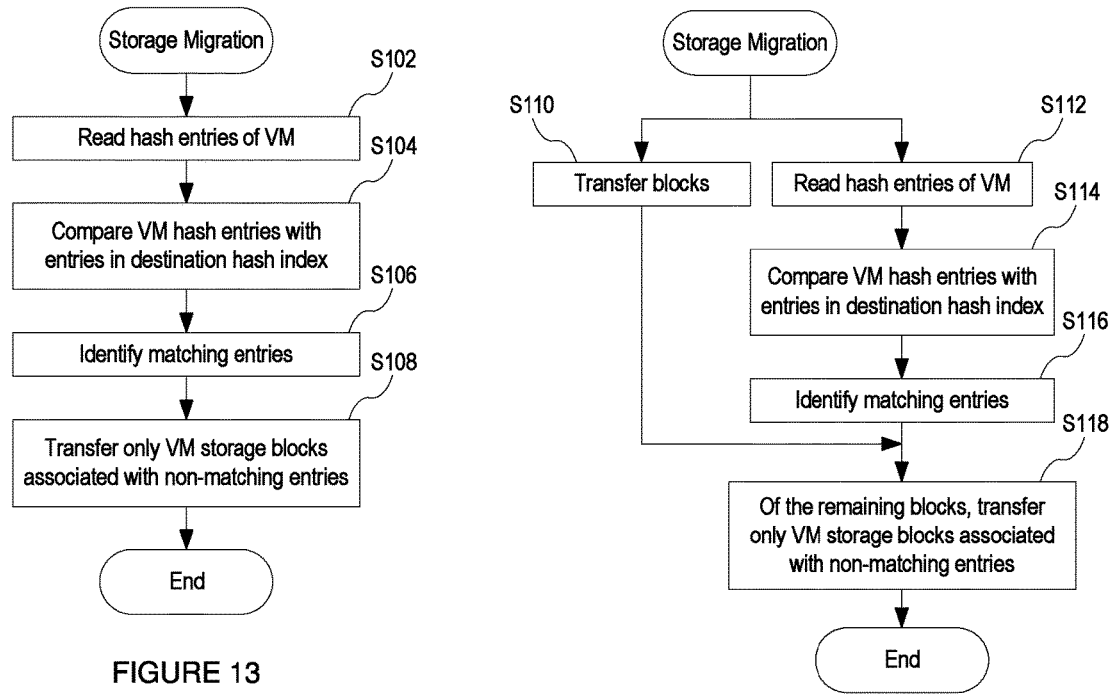
FIGURE 13
FIGURE 14
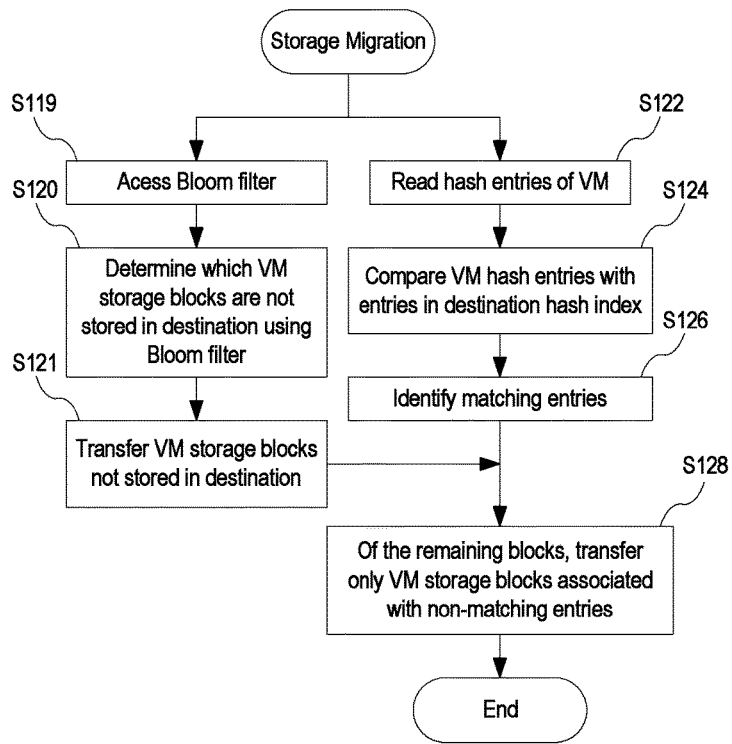
FIGURE 15

COMPUTER STORAGE DEDUPLICATION

CROSS-REFERENCE TO RELATED APPLICATIONS

This application is a continuation-in-part of U.S. patent application Ser. No. 12/356,921, filed Jan. 21, 2009, which claims the benefit of U.S. Provisional Patent Application Ser. No. 61/096,258, filed Sep. 11, 2008. This application also claims the benefit of U.S. Provisional Patent Application Ser. No. 61/179,612, filed May 19, 2009. The entire contents of these applications are incorporated by reference herein.

BACKGROUND

Typical computer file systems store file data in small, fixed-size blocks, referred to by pointers maintained in metadata associated with each file. In the event two pointers refer to identical blocks, some storage capacity can be reclaimed by changing one or both pointers so that they refer to the same block. The process of finding pointers that refer to identical blocks and then changing one or both pointers so that they point to the same block is referred to herein as "deduplication". Such deduplication is typically performed by a gateway that controls access by host computers to the storage medium.

SUMMARY

In one of its aspects, the present invention provides a data center comprising plural computer hosts and a storage system external to said hosts, said storage system including storage blocks for storing tangibly encoded data blocks, each of said hosts including a host operating system with an deduplicating file system driver installed. The file system driver, referred to through the specification and drawings simply as "file system", identifies identical data blocks stored in respective storage blocks. The file system merges such identical data blocks into a single storage block so that a first file exclusively accessed by a first host and a second file accessed exclusively by a second host concurrently refer to the same storage block.

In another of its aspects, the present invention provides a manufacture comprising computer-readable storage media encoded with a file system of computer-executable instructions. The file system, when executed on a host computer system, connects to a storage system managing files, including a shared-block file, encoded in said storage system. The files contain tangibly encoded metadata pointers referring to storage blocks containing tangibly encoded data blocks, said shared-block file having metadata pointers referring to blocks referred to by plural of said metadata pointers, said file system including a write-log handler for updating a hash index having a shared set of entries referring to shared storage blocks indirectly through said shared-block file, and having an unshared set of entries referring to unshared storage blocks indirectly through said files other than said shared-block file, said hash index being tangibly encoded in said storage system.

In another aspect, the invention provides a method comprising a first file system executing on a first host computer system, said first file system managing a first write operation to a first file on a storage system by writing a first data block to a first storage block of said storage system and causing a first metadata pointer of said first file to refer to said first storage block, a second file system executing on a second host computer system managing a second write operation to a second file on a storage system by writing second contents to a second block of said storage system and causing a second metadata pointer of said second file to refer to said second block, and said second file manager determining whether or not said second contents are identical to said first contents, if said second contents are identical to said first contents, said second file manager causing said second metadata pointer to refer to said first block.

In still another aspect, the invention provides a method of migrating an image of a virtual machine stored in a first storage system to a second storage system, the method comprising the steps of comparing entries of a first index that is maintained for storage blocks of the first storage system, including storage blocks of the virtual machine, with entries of a second index maintained for storage blocks of the second storage system, and migrating the image of the virtual machine from the first storage system to the second storage system without transferring all of the storage blocks of the virtual machine from the first storage system to the second storage system. Migration from the first storage system to the second storage system can be performed with less than all of the storage blocks of the virtual machine being transferred because content of some storage blocks of the virtual machine are already stored in storage blocks of the second storage system. This method provides extremely efficient migration of a virtual machine especially in cases where the second storage system already stores images of other virtual machines and these other virtual machines run the same guest operating system as the virtual machine being migrated.

Further embodiments of the invention include a computer system that is configured to efficiently carry out migration of an image of a virtual machine stored in a first storage system to a second storage system. The computer system includes a host computer for a virtual machine, a source storage device having an image of the virtual machine stored therein; and a destination storage device that is physically separate from the source storage device to which the image of the virtual machine is to be migrated. In this system, the host computer is programmed to carry out a migration process for the virtual machine and transfer only a subset of the storage blocks of the virtual machine stored in the source storage device to the destination storage device during the entire migration process for the virtual machine. Because only a subset of the storage blocks of the virtual machine is transferred, this computer system can carry out storage migration of a virtual machine efficiently.

BRIEF DESCRIPTION OF THE DRAWINGS

FIG. 2 emphasizes steps associated with write operations.

FIG. 5 emphasizes steps relating to finding a match between a write record and a hash-index entry.

FIG. 6 emphasizes steps relating to handling matches that refer to mutable block pointers. These steps can include issuing merge requests.

FIG. 7 emphasizes merge-request handling steps of the method of FIG. 2.

FIG. 8 emphasizes steps relating to handling matches that refer to copy-on-write block pointers.

FIG. 9 emphasizes purge steps of the method of FIG. 2.

FIG. 13 is a flow chart of steps of a method of migrating a virtual machine image according to an embodiment of the invention.

FIG. 14 is a flow chart of steps of a method of migrating a virtual machine image according to another embodiment of the invention.

FIG. 15 is a flow chart of steps of a method of migrating a virtual machine image according to still another embodiment of the invention.

DETAILED DESCRIPTION

Figure 1:
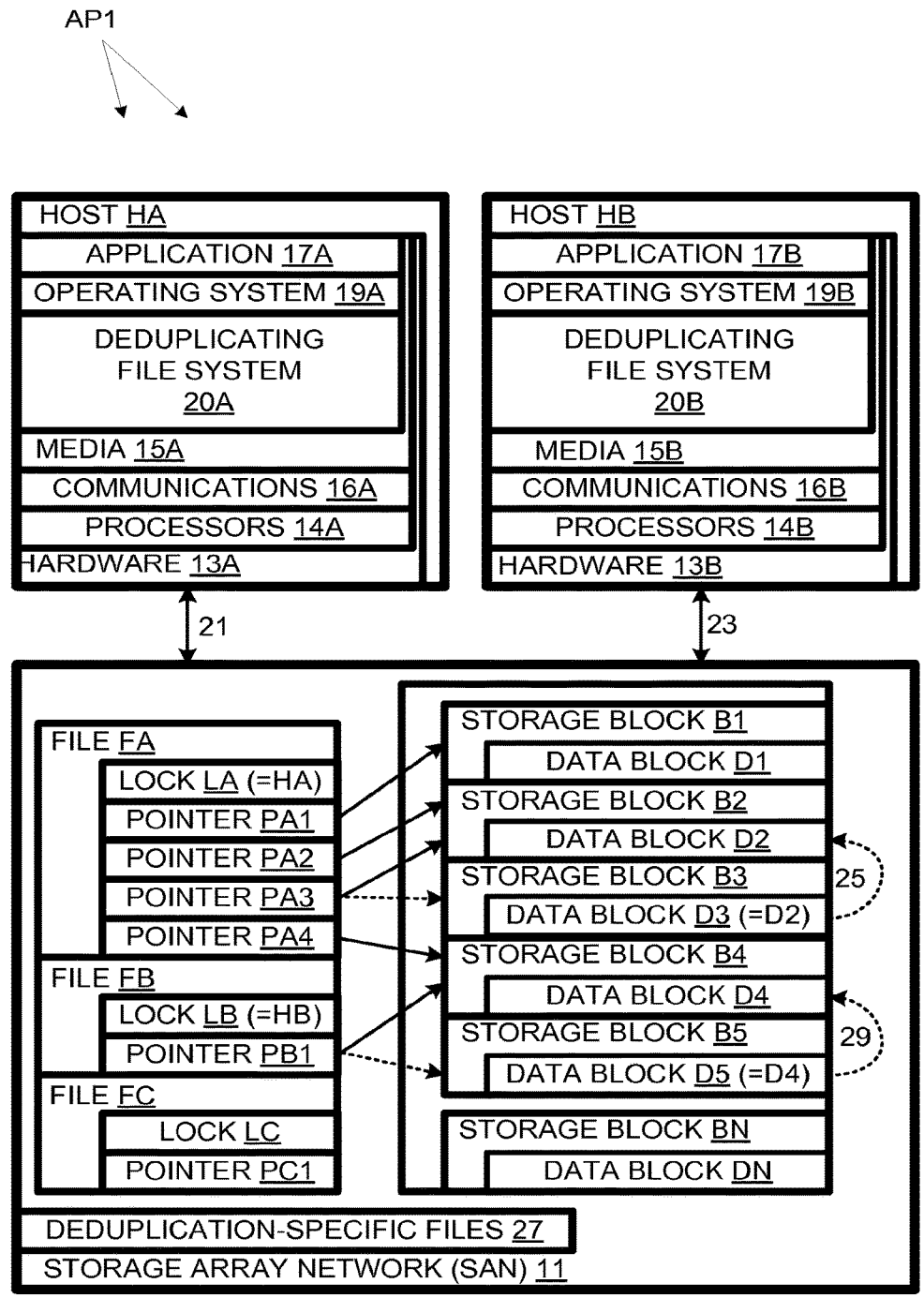
FIG. 1 is a schematic diagram of a data center in accordance with an embodiment of the invention.

A data center AP1 embodying the present invention is depicted in FIG. 1. Data center AP1 includes hosts HA and HB and a storage system in the form of a storage array network (SAN) 11. Host HA includes hardware 13A, including processors 14A, media 15A, and communications devices 16A. Computer-readable storage media 15A is encoded with programs of computer-executable instructions including an application 17A, an operating system (OS) 19A, and a deduplicating file system 20A. Herein, "media" refers to tangible computer-readable storage media, a type of manufacture. "Media" encompasses hard disks, optical disks, and solid-state memory devices. Application 17A runs on operating system 19A, which accesses SAN 11 using file system 20A. Host HB analogously includes hardware 13B, processors 14B, media 15B, communications devices 16B, application 17B, operating system 19B, and deduplicating file system 20B.

As those skilled in the art will surmise, the invention provides for a great variety of data-center and other computer-system topologies. The invention provides for data centers with any number of hosts and the hosts can vary from each other, e.g., in the power and type of hardware involved, the number and types of applications and operating systems run, and schemes for networking the hosts. For example, using virtual-machine technology, one host can run several applications on respective operating systems, all sharing the same file system.

Applications 17A and 17B and operating systems 19A and 19B store data in files such as files FA, FB, and FC. File systems 20A and 20B divide the data into fixed-size blocks, 4 kB in this embodiment, and store it as data blocks D1-DN in respective storage blocks B1-BN. A file is associated with its contents by metadata block pointers. For example, file FA includes a block pointer PA1 that is associated with an offset location within file FA. Block pointer PA1 refers to storage block B1, which contains data block D1. (Note: the dashed arrows represent prior associations between pointers and blocks, while the solid arrows represent current associations between pointers and blocks.) A file typically has many pointers, and more than one of those can refer to a given storage block; for example, file FA includes pointers PA2 and PA3, both of which refer to storage block B2. It is also possible for two pointers from different files to point to the same block; for example, pointer PA4 of file FA and pointer PB1 of file FB both refer to storage block B4.

As indicated by two-way arrows 21 and 23, communications with SAN 11 by hosts HA and HB are largely independent. To prevent conflicting file accesses, hosts HA and HB are prevented from concurrently accessing the same file. To this end, each file includes a lock that can be owned by a host. Although a file can be accessed by at most one host any given time, hosts HA and HB can time-share (access at different times) a file, e.g., file FC, by releasing and acquiring locks. For mnemonic and expository purposes, two files are treated herein as "permanently" owned by respective hosts: host HA permanently owns lock LA, so host HB can never access file FA; likewise, host HB permanently owns lock LB, so host HA can never access file FB. "Permanently" here means "for the entire duration discussed herein".

In data center AP1, deduplication is decentralized. Each host HA, HB has its own deduplicating file system 20A, 20B. There are several advantages over a centralized approach. No specialized hardware is required to handle deduplication. There is no central host that might become a bottleneck or a single-point of failure for data center AP1. Furthermore, the present invention scales conveniently as adding more hosts inherently contributes more resources to the deduplication function.

Deduplication can be effected according to the following example. Prior to deduplication, pointer PA2 referred to storage block B2, and thus to data block D2, while pointer PA3 referred to storage block B3 and thus to data block D3. During a deduplication operation 25, it is determined that data block D3 is equivalent to data block D2. Data block D3 is then effectively merged with data block D2 in storage block B2 by changing block pointer PA3 so that it refers to storage block B2. Storage block B3 is thus freed for another use. Deduplication operation 25 was executed by host HA, while it had exclusive access to file FA, which includes as metadata all block pointers involved in operation 25.

However, the present invention does not require one host to have access to both files involved in a deduplication operation. For example, host HA can discover that storage block B5 and storage block B4 are likely to contain equivalent data blocks even though no file that host HA has access to refers to storage block B5. This discovery of likely equivalence can be made through deduplication-specific files 27. Host HA can record this likely equivalence by issuing a merge request and storing it in one of deduplication-specific files 27. Once host HB can obtain access to the merge request, host HB can determine whether the proposed equivalence is valid and, if so, and change block pointer PB1 (which host HB has access to) to point to storage block B4 to effect deduplication operation 29. Thus, although acting independently, hosts HA and HB can cooperatively implement deduplication by time-sharing deduplication-specific files 27

Due to the large numbers of storage blocks typically handled by a storage system, it is not practicable to compare every possible pair of blocks for possible duplicates. However, since new duplicates only (or at least primarily) arise in the context of write operations, deduplication candidates can be identified by tracking write operations. In an embodiment of the invention, each block is checked for possible matches as part of the write operation. However, the illustrated embodiment monitors write operations but defers deduplication to a time when demand on computing resources is relatively low to minimize any performance penalty to applications 17A and 17B.

Write Operations

Figure 2:
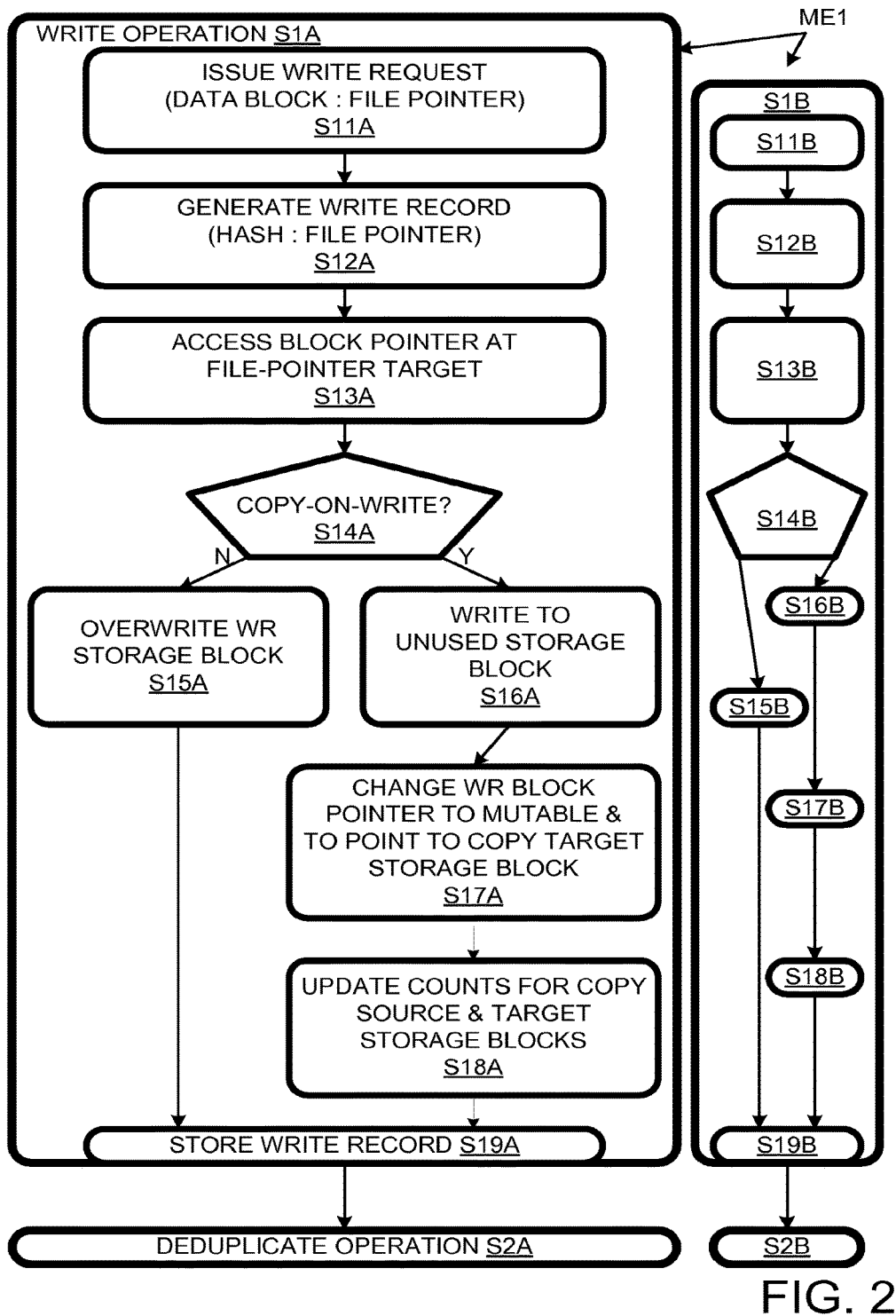
FIG. 2 is a flow chart of a method in accordance with an embodiment of the invention.

Thus, in a method ME1, as flow-charted in FIG. 2, file system 20A monitors write operations originating on host HA during a write operation S1A and later performs a deduplication operation S2A. File system 20A stores information on SAN 11 in 4-kilobyte (4 kB) blocks. (As explained further below, file system 20A uses both one-megabyte (1 MB) and 4 kB blocks in a hierarchical fashion.)

At step S11A, application 17A initiates a write operation, e.g., of data to file FA. The write operation involves writing data to a location with a file stored on SAN 11. Write operations initiated by application 17A may be: 1) confined to a single block; or 2) encompass multiple blocks or at least cross a block boundary. In the latter case, file system 20A breaks the write operations into single-block suboperations, each of which are treated as described below for a single-block write operation. Similarly, the range of write addresses asserted by application 17A is converted to file pointers. Each file pointer specifies a file identifier (file ID) and an offset value (indicating a location within the specified file). Associated with each such file location is metadata defining a block pointer that refers to a 4 kB storage block (B1-BN).

At step S12A, file system 20A detects the write operation and generates a write record. In the process, file system 20A generates a hash of the data block and associates it with the file pointer derived from the write request. In the illustrated embodiment, a write record is only generated for write operations in which an entire block is overwritten. No write record and no ensuing deduplication occurs in response to a write of a partial block. In an alternative embodiment, in the case where a write operation involves only a portion of a block, the remainder of the block must be read in to generate the hash. File system 20A uses an SHA-1 algorithm that generates 160-bit hashes, also known as "fingerprints", "signatures", and "digests", so comparisons are between 20-byte values as opposed to 4 kB values. Two blocks with different hashes are necessarily different. SHA-1 hashes are collision resistant, so it is very unlikely that two blocks with the same hash will be different. To avoid any possibility of a mismatch, bit-wise comparisons of the full blocks can optionally be used to confirm a match indicated by a comparison of hashes. SHA-1 hashes also have security-related cryptographic properties that make it hard to determine a block from its hash. Alternative embodiments use other hash algorithms, e.g., SHA-2, and MD5.

At step S13A, file system 20A accesses the block pointer referred to by the file pointer that file system 20A derived from the write address range specified by application 17A. Thus, for example, a write of block D4 to file FA and an offset associated with block pointer PA4, host HA would access block pointer PA4.

File systems 20A and 20B distinguish between copy-on-write (COW) block pointers and "mutable" block pointers. A mutable-type pointer indicates that the target storage block can be overwritten. A COW-type pointer indicates that the target storage block must not be overwritten. For example, a storage block such as B2 in FIG. 1 that is referred to by more than one block pointer (PA2 and PA3) normally should not be overwritten. Instead, its contents can be copied to a free storage block, which can then be overwritten without invalidating other pointers. In an alternative embodiment, storage block reference counts rather than pointer types determine whether or not a write can be performed in place.

At step S14A, file system 20A determines whether: 1) the write operation can be performed in place, i.e., the target block can be overwritten; or 2) the write operation must be performed on a copy of the target block, e.g., because other files referring to the block expect it to remain unchanged. In the illustrated embodiment, this determination is made by examining the COW vs. mutable type of the block pointer accessed in step S13A. If the pointer is mutable, the data block specified in the write operation overwrites the contents of the storage block referred to at step S15A. If the block pointer type is COW, a copy-on-write operation is performed and the data block is written to a free storage block at step S16A. The block pointer accessed in S13A is changed to refer to the new storage block at step S17A; its type remains "mutable". A storage-block reference count associated with the newly used storage block is incremented from "0" ("free") to "1" ("unique"), at step S18A. Also, at step S18A, a storage-block reference count associated with the copy-source block is decremented, as one fewer block pointer refers to it.

At step S19A, the write record generated in step S12A is transferred from host HA to SAN 11. Typically, write records accumulate at the host where they are organized by destination file. The write records are then transferred to write logs on SAN 11 for their respective files. The write records are subsequently used during deduplication operation S2A, typically scheduled for low utilization times, e.g., 2 am. Method ME1 analogously provides for steps S1B, S2B, and S11B-S19B for implementation by host HB.

Data Center Detail

Figure 3:
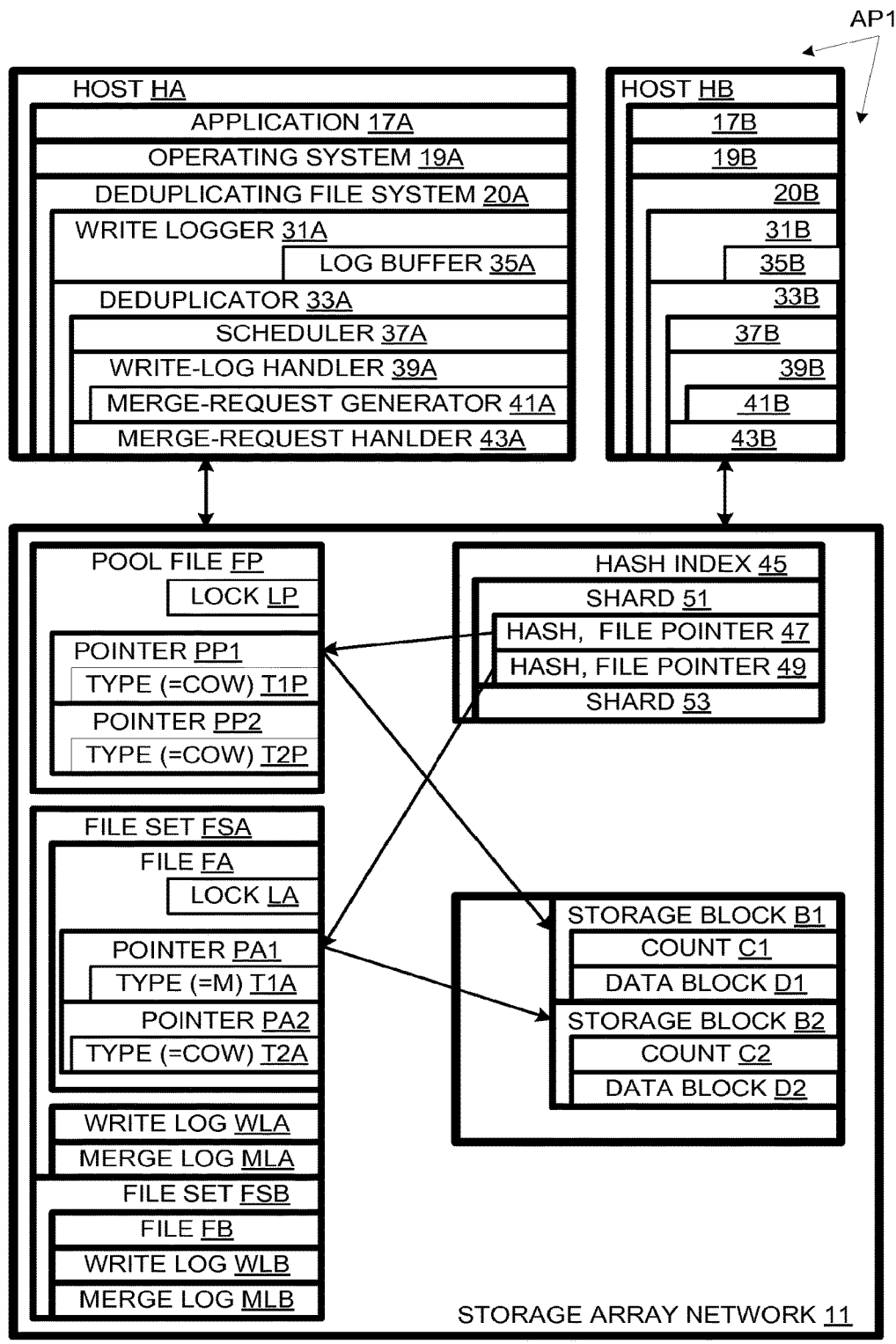
FIG. 3 is a more detailed schematic diagram of the data center of FIG. 1.

As shown in FIG. 3, file system 20A for host HA includes a write logger 31A and a deduplicator 33A. Write logger 31A generates write records and stores them temporarily in a log buffer 35A on host HA. Deduplicator 33A includes a scheduler 37A, a write-log handler 39A including a merge-request generator 41A, and a merge-request handler 43A. File system 20B of host HB analogously includes a write logger 31B with buffer 35B, a deduplicator 33B, a scheduler 37B, a write-log handler 39B with a merge-request generator 41B, and a merge-request handler 44B.

SAN 11 includes storage blocks including blocks B1 and B2, file sets including file sets FSA and FSB, a hash index 45, and a shared-block or "pool" file FP. Hash index 45, pool file FP, write logs WLA and WLB, and merge logs MLA and MLB are examples of deduplication-specific files FS (FIG. 1). Each file set includes a "characteristic" file, e.g., file FA for file set FSA, and may also include an associated write log file, e.g., write log WLA, and/or an associated merge log file, e.g., merge log MLA. The "may" in the preceding sentence arises because: 1) where there is no write-record associated with the characteristic file, the file set does not include a write log file; and 2) if there are no merge requests associated with the characteristic file, the file set includes no merge log file. An alternative embodiment provides for empty write-log files and empty merge-log files.

Write logs, e.g., write logs WLA and WLB, and merge logs, e.g., merge log MLA and WLB, are files with structures analogous to characteristic files. In other words, their contents, including write records and merge requests, are arranged in data blocks that are, in turn, stored in storage blocks B1-BN. The write logs and merge logs include metadata block pointers that refer to the storage blocks that store the write records and merge requests. For expository purposes, the characteristic files (e.g., FA and FB) are considered herein in their physical aspect (e.g., with metadata block pointers), while ancillary files, e.g., write logs and merge logs, are considered herein in their logical aspect, i.e., with direct reference to contents.

Write logs WLA and WLB are written to when storing write records and read from when processing those records during deduplication. They are also read from to discover hash-index entries that can be purged. The ownership of write log files follows ownership of the associated main files. Thus, host HA, for example, has exclusive access to write log WLA as long as it has exclusive access to file FA.

All other deduplication-specific files are accessible from both hosts HA and HB on a time-share basis (i.e., at different times, both host HA and host HB have exclusive access to these deduplication-specific files), whether or not the associated main files are. For example, host HA can access merge-request log MLB on a time-share basis even though it cannot access file FB at all. This allows host HA to store a merge request for handling by host HB.

Figure 4:
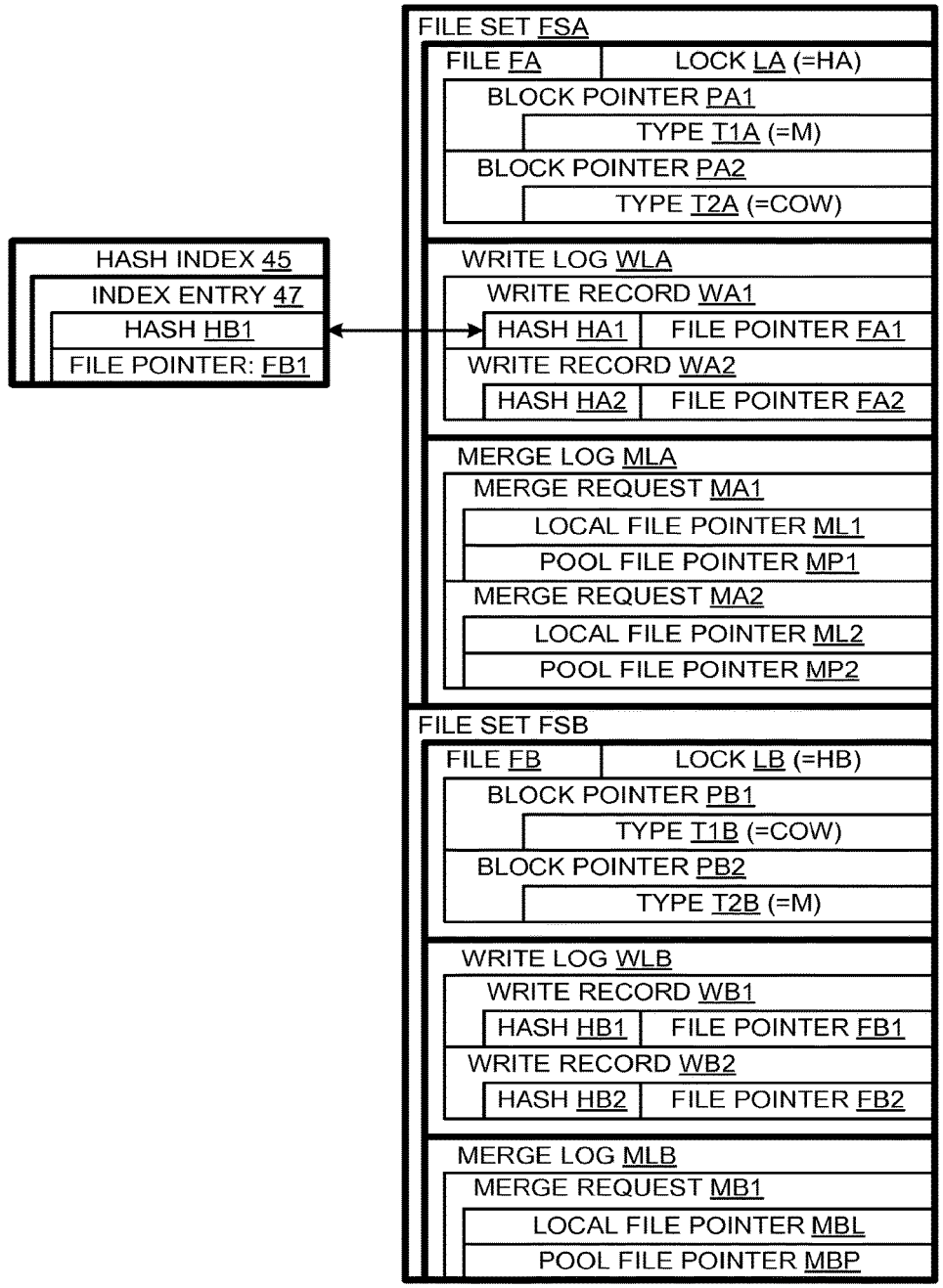
FIG. 4 is a schematic block diagram of a pair of file sets of the data center of FIG. 1.

File sets FSA and FSB are shown in more detail in FIG. 4. In FIG. 4, for reasons given above, characteristic files FA and FB are represented in their physical aspect with block pointers, while ancillary files WLA, WLB, MLA, and MLB are presented in their logical aspect with contents. In particular, write log WLA includes write records WA1 and WA2, while write log WLB includes write records WB1 and WB2. Each write record WA1, WA2, WB1, WB2, includes a hash value HA1, HA2, HB1, HB2, (corresponding to the data block that was written) and a file pointer FA1, FA2, FB1, FB2 (corresponding to the write destination from the perspective of operating systems 19A and 19B). The write logs serve to store records of write operations on a per-destination basis for subsequent deduplication processing.

Merge log MLA includes merge requests MA1 and MA2, while merge log MLB includes merge requests MB1 and MB2. Each merge request MA1, MA2, MB1 specifies two file pointers: a "local" file pointer ML1, ML2, MBL, and a "pool" file pointer MP1, MP2, MBP. The local file pointer refers to a location in the associated characteristic file. For example, local file pointer ML1 points to an offset within characteristic file FA. (Note that since each ancillary file (write log or merge log) is associated with only one characteristic file, the local file pointer need only specify explicitly an offset.) The pool file pointer refers to a location within pool file FP.

The local file pointers and pool file pointers refer directly to file locations with associated block pointers. Thus, the local file pointers and pool file pointers refer indirectly to storage blocks. In an alternative embodiment, a merge request includes the block pointer from the pool file instead of a pool-file block pointer. In other words, in the alternative embodiment, merge requests refer to storage blocks directly rather than indirectly through an intermediate file (e.g., FA or FB).

Hash index 45 serves, albeit on a delayed basis, as a master list of all used storage blocks. Hash index 45 includes entries 47, 49, etc., assigning hash values to file pointers. The file pointers refer to file locations associated with block pointers associated with storage blocks associated with data blocks that are represented by the hashes. In other words, hash index 45 indirectly indexes storage blocks by their contents.

Hash index 45 is divided into horizontal shards 51 and 53. Each shard covers a pre-determined range of hash values, e.g., shard 51 includes hash values beginning with "0" while shard 53 includes hash values beginning with "1". Dividing the hash index allows both hosts HA and HB to access respective shards concurrently and then switch so that each host has access to all entries. The number of shards into which a hash index is divided can be larger for greater numbers of hosts so that all or most hosts can access respective parts of the hash index concurrently.

In an alternative embodiment, each hash index is explicitly associated with a list of all file pointers that refer to respective block pointers to the same block. In the illustrated embodiment, only one file pointer is listed per hash value. For hash values that are associated with more than one block pointer, the associated file pointers points to a pool file location. A block pointer associated with that pool file location refers to the common block referenced by those block pointers.

Pool file FP, like other files FA and FB, includes a lock LP and block pointers PS1 and PS2. Basically, hash index entries, e.g., 47, 49 refer either to pool files or other files. Hash index entries that refer to pool file FP refer to COW-type block pointers, while hash index entries that refer to other files refer to mutable-type block pointers. The COW-type pointers refer to blocks that are or at least were shared; the mutable block-type pointers refer to blocks that are not shared. In an alternative embodiment, there is no pool file and a hash index entry lists all file pointers associated with shared blocks.

Finding a Match

Figure 5:
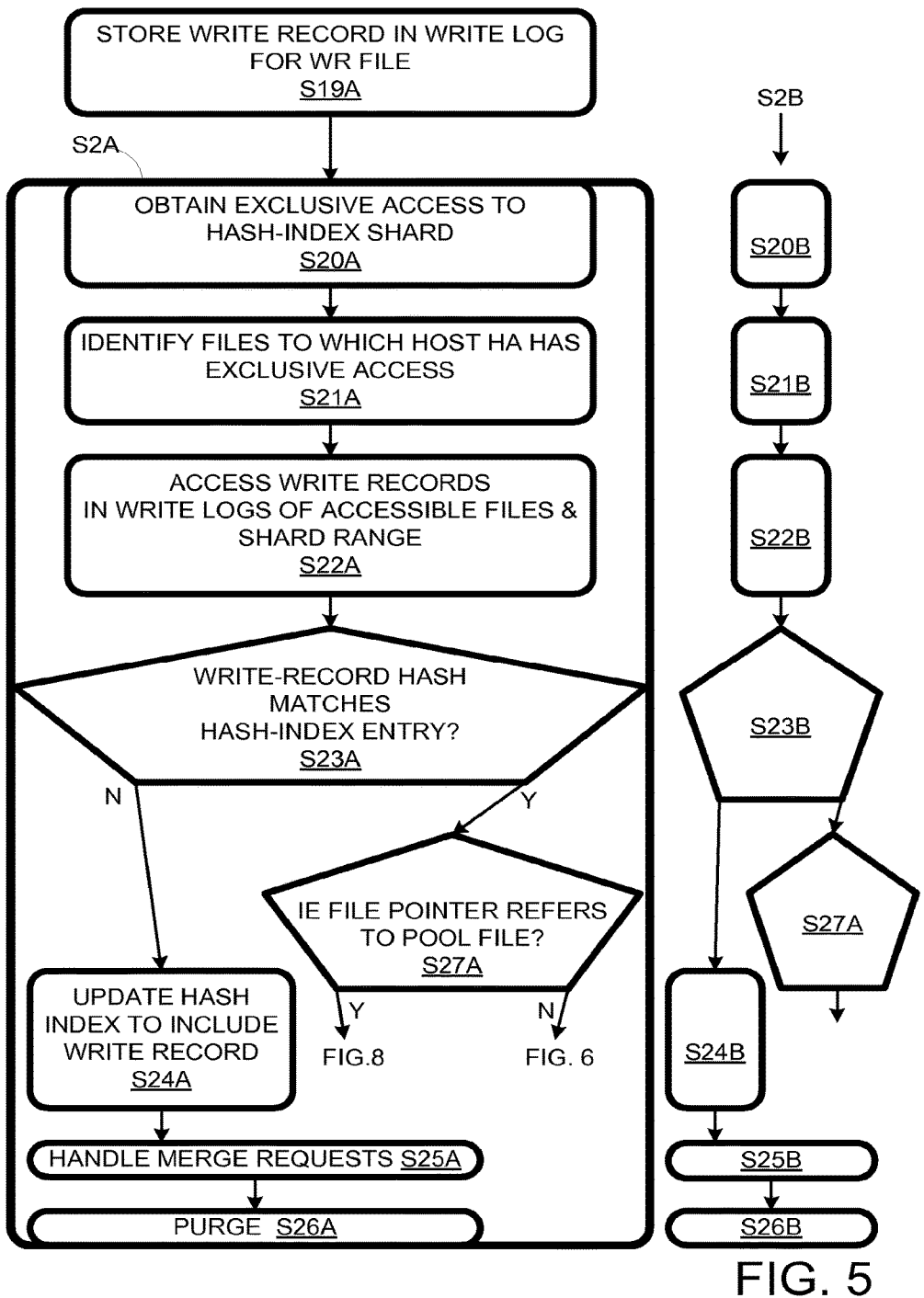
FIG. 5 is a flow chart of deduplication steps of the method of FIG. 2.

Before storage block contents can be merged, they must be determined to be identical. To this end, content hashes are compared; more specifically, the hash in a write record is compared to possibly matching hashes in hash index 45. Thus, as shown in FIG. 5, step S20A involves obtaining exclusive access to hash index 45 or at least one of its shards 51, 53. In one or more embodiments, after a hash match is found, content of the blocks are compared to prevent false matches.

At step S21A, file system 20A identifies files to which host HA has exclusive access, e.g., by checking locks. At step S22A, write-log handler 39A, accesses write records in write logs of accessible files; only those write records having hashes in the range of the accessed shard are processed until a different shard is accessed. In embodiments in which the hash index is not divided into shards, all accessible write records can be accessed. Even in embodiments in which hashes that are not broken down into shards, the hashes can be ordered so that only a fraction of the hash entries need to be checked to establish a "miss" (no matching index entry).

At step S23A, for each write record, a determination is made whether or not the hash in the record matches a hash value in hash index 45. If there is no match, then the data block corresponding to the write record is unique. No deduplication is possible; however, the hash index is updated at step S24A to include a new entry corresponding to the write record. The entry includes the hash value and the file pointer of the write record. This completes processing of the subject write record. The next steps are handling merge requests at step S25A and purging deduplication-specific files FD. These two steps are discussed further below.

If, at step S23A, a match is found, then the file pointer associated with that hash in the hash index is accessed at step S27A. Referring to FIG. 4, hash HA1 of write record WA1 matches hash HB1 of index entry 47. A write record matches an index entry when their hashes are equal. It is not necessary and it is not likely that write-record file pointer FA1 would match index entry file pointer FB1. Note that steps S20A-S27A have host HB counterparts S20B-S27B.

Write-record file pointer FA1 specifies a file (file FA) and an offset in that file at which block pointer PA4 is located.

Block pointer PA4 refers to storage block B4 that contains data block D4. Herein, "WR file", "WR offset", "WR block pointer", "WR storage block" and "WR data block" all refer to entities specified by or directly or indirectly referred to by a write record. Likewise, a prefix "IE" refers to entities specified by or referred to by an index entry file pointer in its original form. If an index entry file pointer has been revised, the prefix "RE" is used.

Match Points to Unique Storage Block

In effect, a write record that does not match any pre-existing index entries is itself entered into hash index 45. Initially, the new entry specifies the same file pointer (file and offset) that the write record specifies. This entry remains unchanged until it is matched by another write record. In the meantime, the IE file pointer refers to the original mutable-type WR block pointer that, in turn, refers to a WR storage block. However, since the WR block pointer is mutable, the WR data block may have been overwritten between the time the write record was generated and the time the match was recognized. In this case, the match between the WR hash and the IE hash is obsolete.

If the host processing the write record does not have access to the IE file, the host will not be able to determine whether or not the hash-index entry is obsolete. For example, if host HA is processing a write record for file FA and if that write record matches a hash-index entry that refers to file FB, host HA will, in effect, need the help of host HB if the validity of the index entry is to be determined. However, since hosts HA and HB access SAN 11 independently, this cooperation cannot depend on cooperative action. Instead, host HA makes its information available by copying its block pointer to pool file FP and transferring the rest of the deduplication task to host HB in the form of a merge request.

Figure 6:
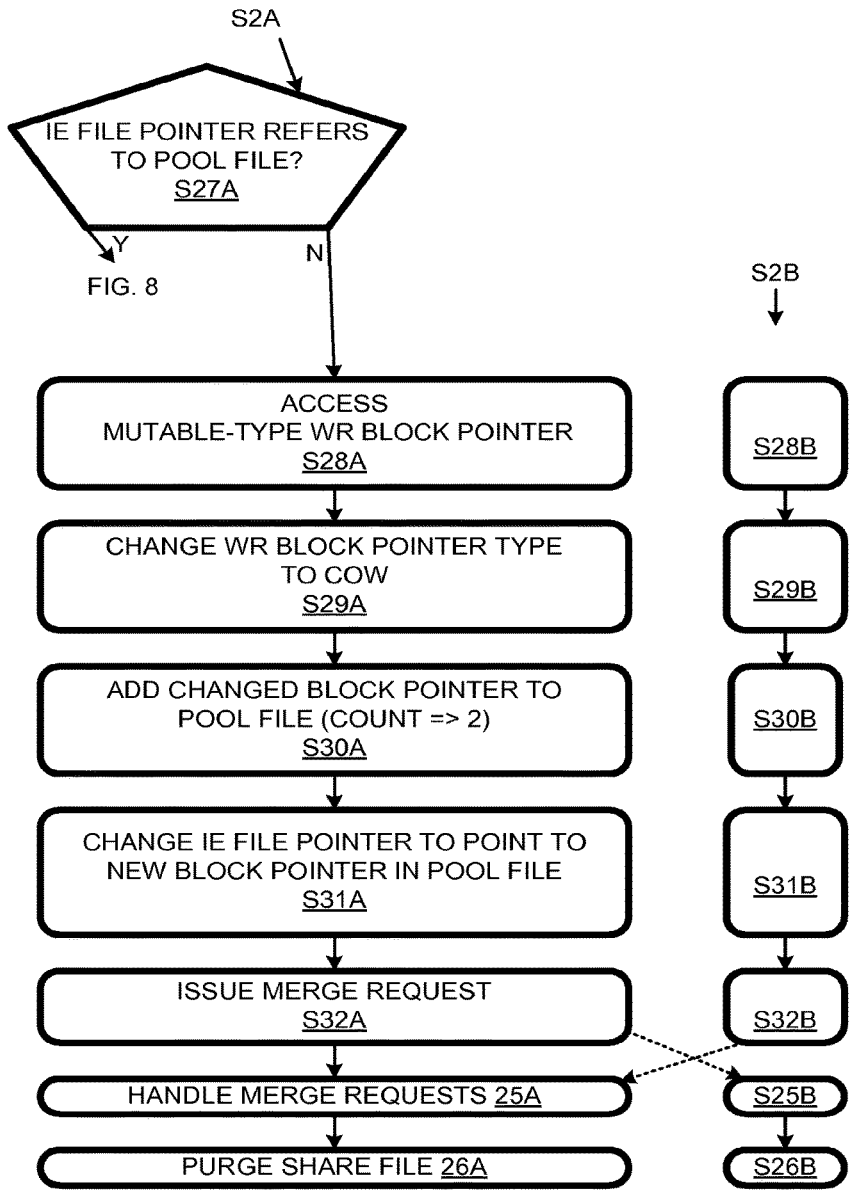
FIG. 6 is a flow chart of deduplication steps of the method of FIG. 2.

When, at step S27A, write-log handler 39A determines that the IE file is not pool file FP, method ME1 continues at step S28A, as shown in FIG. 6. While it may not have access to the IE file, the host processing a write record must have access to the WR file and WR mutable-type block pointer. This block pointer is accessed at step S28A.

At step S29A, the type of the WR block pointer is changed from "mutable" to "COW". At step S30A, this newly COW-type WR block pointer is added to pool file FP so that it is accessible by all hosts. Since the WR file and the pool file now share the WR storage block, its count is incremented to "2".

At step S31A, the IE file pointer is changed to refer to the pool file. (Note: it is this step that leads to the inference that an index entry that refers to a file other than pool file FP has not been matched previously.) This resulting revised-entry RE file pointer now points to the WR storage block. For example, if host HA is processing a write record referring through WR block pointer PA4 to WR storage block B4 (as shown in FIG. 1) and the index entry refers to IE block pointer PB1 which refers to IE storage block B5, step S31A causes the revised entry to refer through pool file FP4 to RE storage block B4 instead of IE storage block B5. Even if IE storage block B5 has been overwritten, the RE data block corresponds (at least at the time of the write operation represented by the write record) to the matching IE hash.

Since access to files is exclusive, the host processing a write request will not generally have access to IE block pointer. If the host cannot access the IE file, it cannot identify the IE storage block and cannot change the IE block pointer to match the one in the pool file (from step S30A). Accordingly, the host transfers responsibility for these tasks to a host with access to the IE file by issuing a merge request and storing it the merge log for the target file. For example, merge-request generator 41B can store a merge request in merge log MLB for handling by merge-request handler 43B of host HB at step S25B. Likewise, merge request generator 41B of host HB can store merge requests in merge log MLA for handling by merge-request handler 43A of host HA at step S25A.

In an alternative embodiment, a host completes match determinations when it has access to the file referred to by the index entry. Thus, merge requests are only issued when the non-pool file referenced by an index entry is inaccessible to the host processing the write record.

Handling Merge Requests

Figure 7:
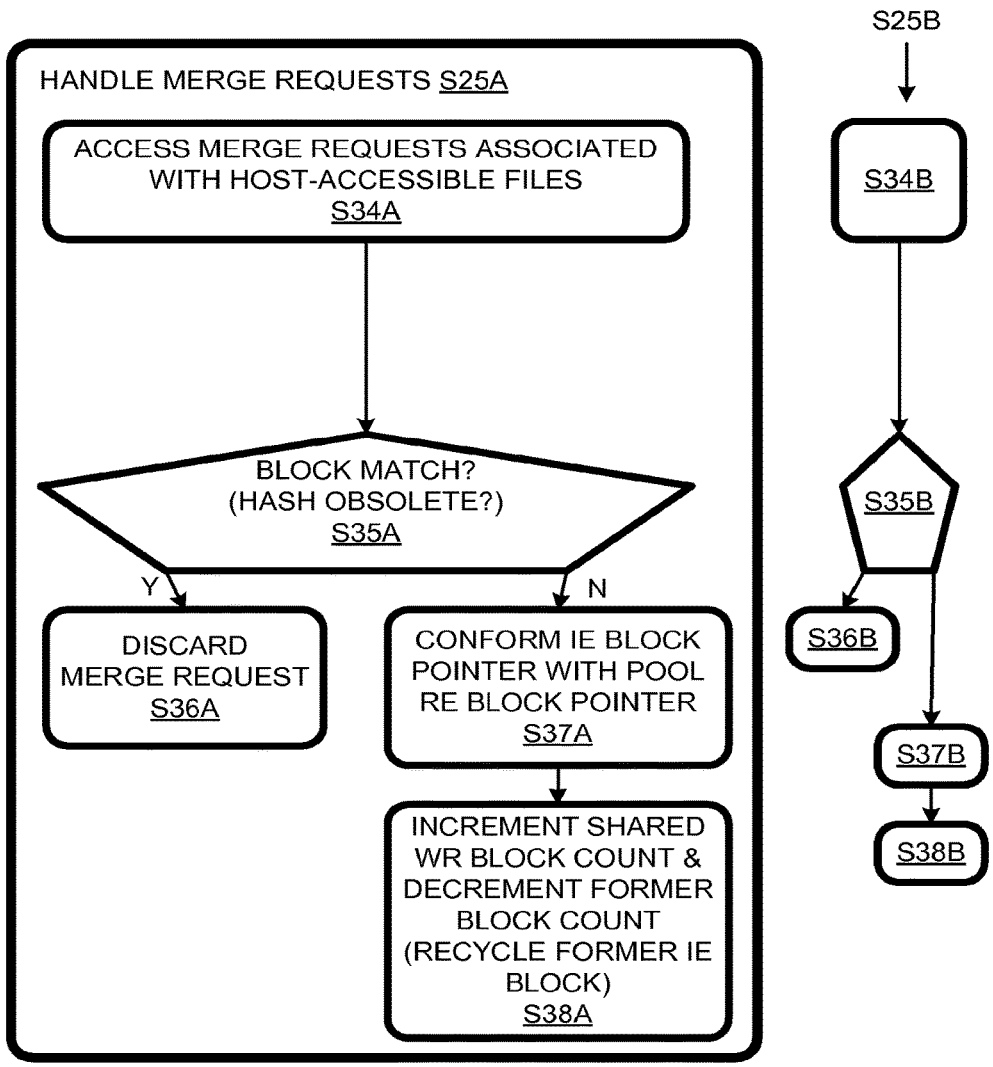
FIG. 7 is a flow chart of deduplication steps of the method of FIG. 2.

Steps S25A and S25B include several substeps, herein referred to as "steps", as shown in FIG. 7. At step S34B, host HB accesses the merge requests for files accessible to host HB. As shown in FIG. 4, a merge request specifies: 1) the IE file pointer, and 2) the RE block pointer in pool file FP. The RE block pointer refers to the WR storage block. The issue is whether the IE data block matches the WR/RE data block. At step S35B, the contents of the IE and RE blocks are compared, e.g., by generating and comparing their hashes.

If the comparison disconfirms the equality of the IE data block and the RE data block, host HB discards the merge request without performing any deduplication at step S36B. The IE block pointer and the IE storage block remain unchanged in response to the merge request. The WR storage block remains "shared" by pool file FP and the WR file. In an alternative embodiment, the hash index and the pool file revert to their respective states before processing of the write record that resulted in the merge request.

If the comparison at step S35B confirms the match, the IE block pointer in the exclusive file is conformed to the COW-type block pointer in the pool file at step S37B. At step S38B, block counts are adjusted. The IE storage block that had been referred to by one pointer is now referred to by zero, so its count is decremented from "1" to "0". The IE storage block referred to in the pool file has its count incremented from "2" to "3".

For example, if, in the course of processing a merge request, host HB determines that the contents of storage block B5 still correspond to the index-entry hash, pointer PB1 will be changed from pointing to storage block B5 to storage block 54, as in deduplication operation 29 of FIG. 1. This completes the portion of method ME1 dealing with handling a write record that matches a unique hash-index entry. Analogous method steps S33A-S38A are implemented by host HA.

Handling a Match that Refers to the Pool File

When a write record matches a unique index entry, the index entry is changed so that it refers to the pool file instead of its original file. In the illustrated embodiment, index entries do not change in the other direction. In an alternative embodiment, storage blocks referred to by the pool file and only one other block pointers revert back to having unique index entries and are treated in the same manner as an original unique entry.

Figure 8:
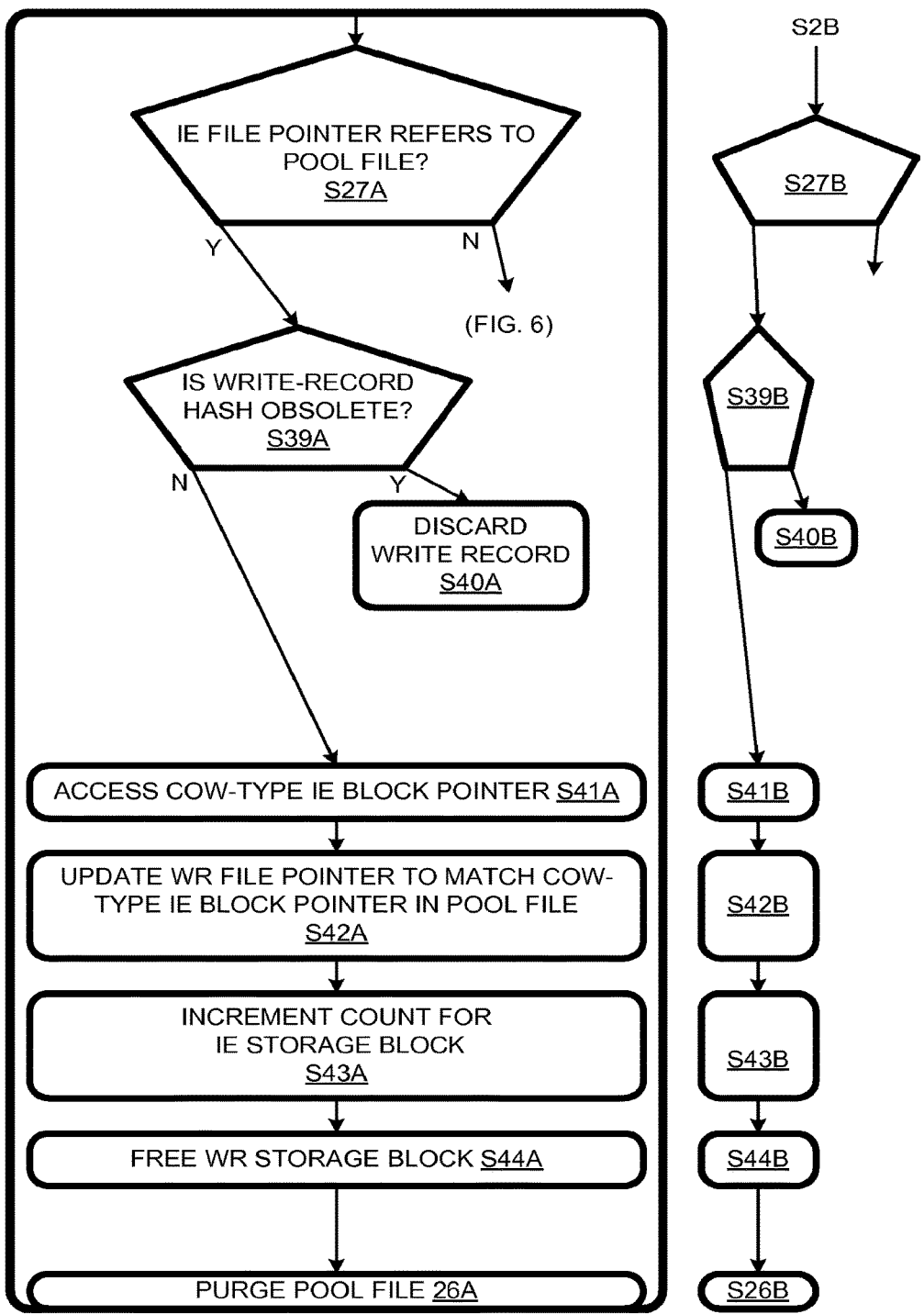
FIG. 8 is a flow chart of deduplication steps of the method of FIG. 2.

If at step S27A, the matching index entry refers initially to pool file FP, a new hash is generated from the contents of the WR storage block at step S39A, shown in FIG. 8. If the hashes do not match, the write record is discarded at step S40A. In this case, the hash index, block pointers, and block counts all remain unchanged.

If at step S39A, the match is confirmed (not obsolete), host HA accesses the IE block pointer in the pool file entry at step S41A. The WR block pointer is updated to match the IE block pointer in pool file FP at step S42A. At step S43A, the IE storage block count is incremented. At step S44A, the count for the WR storage block is decremented to zero, and that block is freed. Host HB can implement analogous steps S39B-S44B for handling matches to shared entries.

Purging

Figure 9:
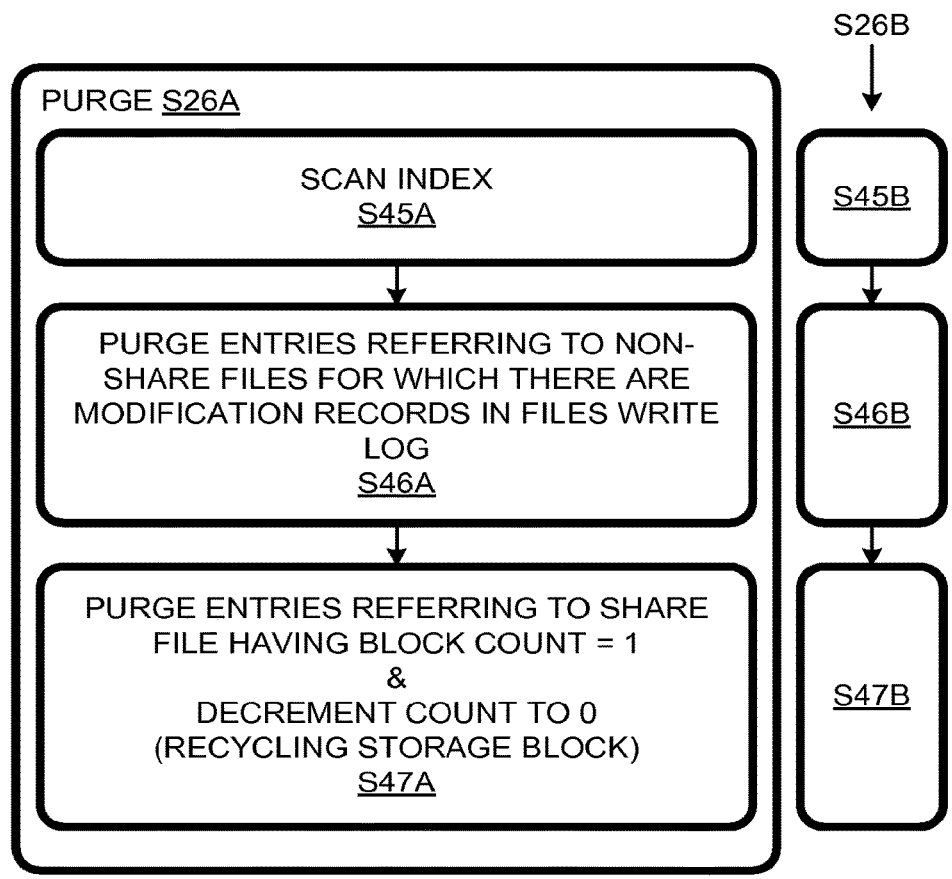
FIG. 9 is a flow chart of deduplication steps of the method of FIG. 2.

Purge steps S26A and S26B are flow charted in FIG. 9. When a free storage block is first written to, its count is incremented from "0" to "1". When that block becomes shared, its count is incremented twice: once due to a block pointer in the pool file, and once because it is referred to by a second block pointer in the same or a different characteristic file. Thus, the count jumps from "1" to "3".

Each attempt to overwrite the shared block yields a COW operation so that one less pointer refers to the original storage block; in this case, the count is decremented by one. Thus, a COW operation can drop a count from "3" to "2"; the next COW operation on that block can drop the count from "2" to "1", corresponding to the fact that only the pool file now points to the storage block. Since no other file points to that block, it can be freed by decrementing its counters to "0", and purges corresponding entries in the pool file and the index.

In addition, an unprocessed write log may indicate that a unique storage block has been overwritten. If, before that write log is processed, another write log matches the hash for the unique storage block, method ME1 will determine that there is no match. This effort can be avoided by simply purging unique index entries for which the file pointer matches the file pointer of an unprocessed write record.

Accordingly, purge method S26A involves host HA scanning hash index 45 at step S45A. Purging hash index entries with file pointers that match those of unprocessed write records at step S46A. At step S47A, hash index entries corresponding to shared blocks with a count of "1" are purged along with the referenced pool file entries. Also at this step, the referenced storage block is freed by setting its count to "0". Steps S45B-S47B are performed analogously by host HB.

Mixed File Block Size Support

In file systems, data is managed in blocks of some fixed size. For example, some commonly used file systems use 4 kilobyte blocks and some other file systems (e.g., VMware™ VMFS) use bigger blocks such as 1 megabyte blocks. Managing data in larger size blocks simplifies many read and write operations and reduces the amount of metadata needed to keep track of stored data. However, deduplication tends to be more effective when smaller blocks are used as the probability of finding two matching data blocks is higher.

Figure 10A:
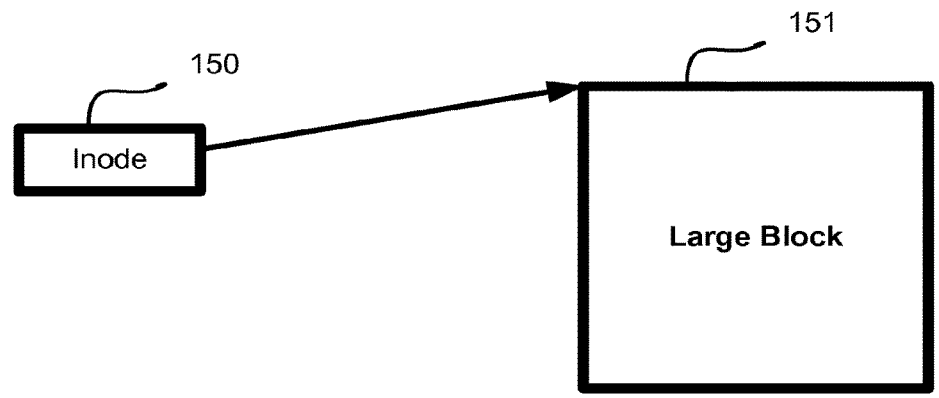
FIGS. 10A and 10B illustrate the use of a fragment pointer block to manage data blocks of large sizes.
Figure 10B:
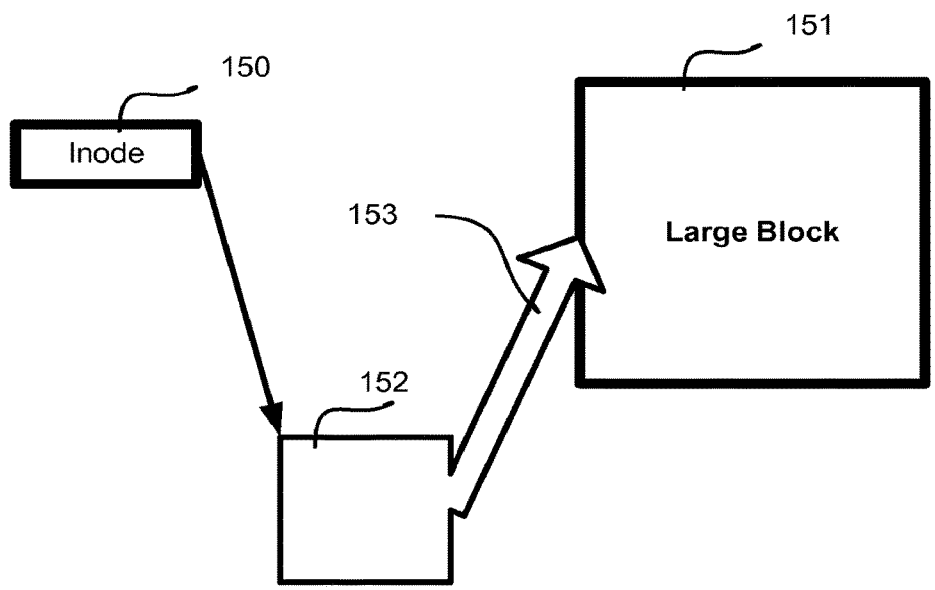

FIG. 10A illustrates a file inode 150 having a pointer to a large data block 151. Inode 150 may include a plurality of pointers, each pointing to a different large data block. Inode 150 is a data structure that is used to store file metadata. In one embodiment, as illustrated in FIG. 10B, a fragment pointer block 152 is introduced between inode 150 and the large data block 151. The fragment pointer block 152 includes pointers to small file blocks totaling up to the size of a large file block. That is, the large file block is logically divided into a number of smaller blocks. Pointers 153 to each of these smaller blocks are then stored in the fragment pointer block 152.

In one embodiment, to make the file system aware of this block fragmentation, a flag is stored in inode 150 to indicate that a pointer in inode 150 now points to a fragment pointer block. In one embodiment, this flag is stored in the pointer that points to the fragment pointer block. In this embodiment, if the flag is set to a particular state (e.g, yes or no or 0 or 1, etc.), the file system adjusts itself to manage multiple smaller blocks. In one example, consider a direct file whose inode consists of pointers to 1 megabyte file blocks. To individually address a 4 kilobyte block at an offset of 1032 kilobytes into the file, the second 1 megabyte block of the file is divided into 256 four kilobyte blocks. A fragment pointer block is allocated to store the pointer to the 256 small blocks and the pointer to the original 1 megabyte block is replaced with a pointer to the fragment pointer block.

Storage Migration of Virtual Machines

Figure 11:
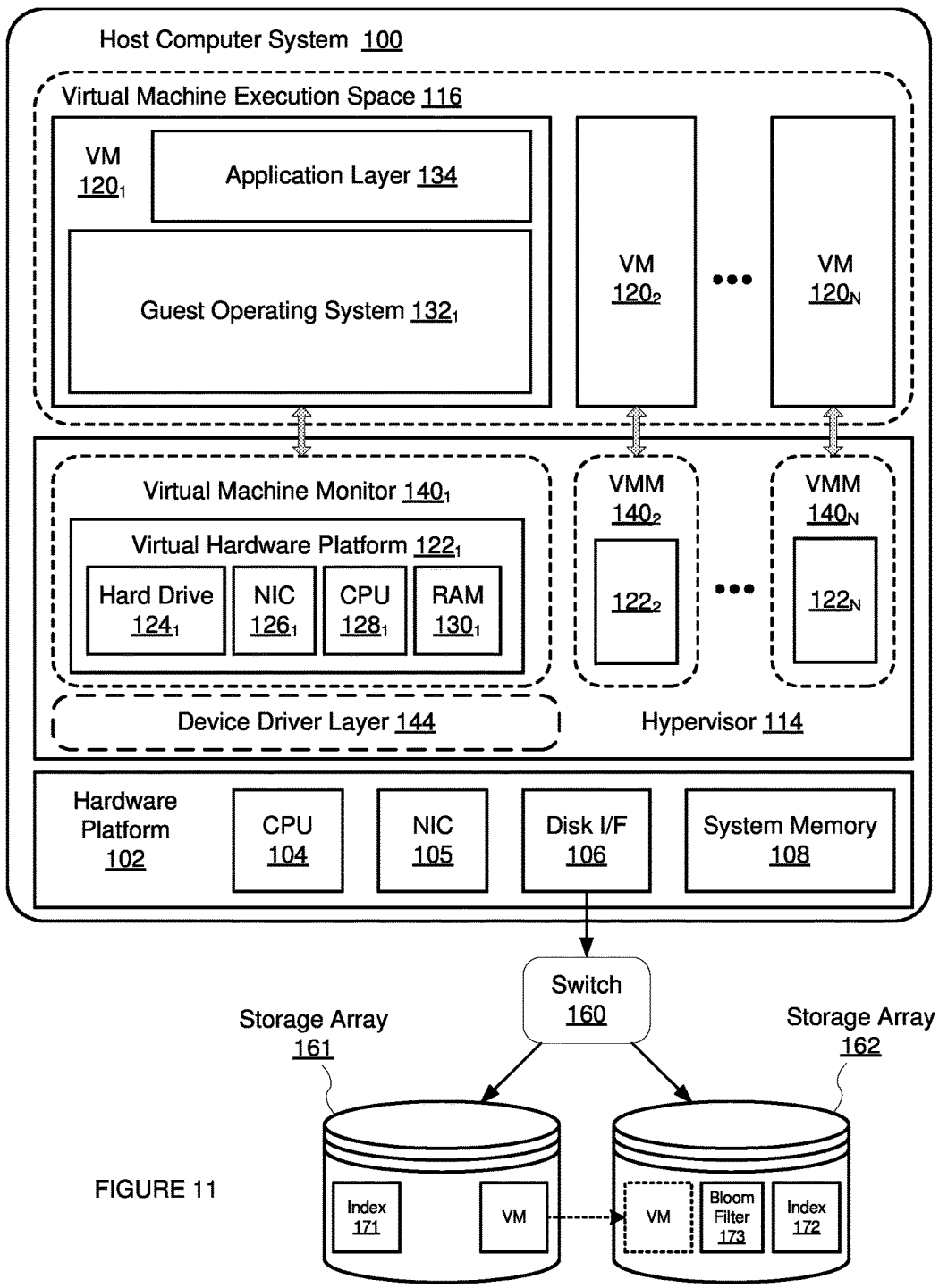
FIG. 11 is a schematic diagram of a single host system that carries out a migration of a virtual machine image from a source storage device to a destination storage device.

FIG. 11 is a schematic diagram of a single host system that carries out a migration of a virtual machine image from a source storage device to a destination storage device. Host computer system 100 may be constructed on a desktop, laptop or server grade hardware platform 102 such as an x86 architecture platform. The hardware platform includes one or more CPUs 104, a network adapter (NIC 105), a disk interface 106, system memory 108, and other I/O devices such as a mouse and keyboard (not shown in FIG. 11). Data storage for host computer 110 is served by a storage area network (SAN), which includes a storage array 161 (e.g., a disk array), a storage array 162 (e.g., a disk array), and a switch 160 that connects host computer system 100 to storage array 161 and storage array 162. Switch 160, illustrated in the embodiment of FIG. 11, is a SAN fabric switch, but other types of switches may be used. In addition, distributed storage systems other than SAN, e.g., network attached storage, may be used. Also, in some embodiments of the invention, local storage, such as a hard disk drive, may be used.

A virtualization software layer, also referred to hereinafter as hypervisor 114, is installed on top of hardware platform 102. Hypervisor 114 supports virtual machine execution space 116 within which multiple VM processes may be concurrently executed to instantiate VMs $120_1$-$120_N$. For each of VMs $120_1$-$120_N$, hypervisor 114 manages a corresponding virtual hardware platform (i.e., virtual hardware platforms $122_1$-$122_N$) that includes emulated hardware such as virtual hard drive $124_1$, virtual NIC $126_1$, virtual CPU $128_1$ and guest physical RAM $130_1$ for VM $120_1$. For example, virtual hardware platform $122_1$ may function as an equivalent of a standard x86 hardware architecture such that any x86 supported operating system, e.g., Microsoft Windows®, Linux®, Solaris® x86, NetWare, FreeBSD, etc., may be installed as guest operating system $132_1$ to execute any supported application in application layer 134 for VM $120_1$. Device driver layers in guest operating system $132_1$ of VM $120_1$ includes device drivers that interact with emulated devices in virtual hardware platform $122_1$ as if such emulated devices were the actual physical devices. Hypervisor 114 is responsible for taking requests from such device drivers and translating the requests into corresponding requests for real device drivers in device driver layer 144 of hypervisor 114. The device drivers in device driver layer 144 then communicate with real devices in hardware platform 102.

It should be recognized that the various terms, layers and categorizations used to describe the virtualization components in FIG. 11 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate from VMMs $140_1$-$140_N$, and VMMs $140_1$-$140_N$ may be considered to be separate from hypervisor 114. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Images of VMs $120_1$-$120_N$ are stored in either storage array 161 or storage array 162. In addition to the images of VMs, each of storage array 161 and storage array 162 stores a hash index. Hash index 171 has the same structure as hash index 45. Entries of hash index 171 include hash values generated from content that are written into blocks of storage array 161. Hash index 172 also has the same structure as hash index 45. Entries of hash index 172 include hash values generated from content that are written into blocks of storage array 162. In some embodiments, a Bloom filter 173 is maintained for storage array 162. As known in the art, Bloom filter 173 is a bit array with associated hash functions. Bloom filter 173 is updated each time content is written into a block of storage array 162. The update process is as follows: (1) content that is written is input into the hash functions to generate a number of bit array positions; and (2) the bits of Bloom filter 173 at these bit array positions are set to 1. When Bloom filter 173 is updated in this manner, Bloom filter 173 can be used later to determine whether a block with certain content is "not" stored in storage array 162.

A migration of VM image stored in storage array 161, e.g., VM 174, also known as "storage migration," may be desired if the workload on storage array 161 is high relative to storage array 162. A decision on whether such migration should be carried out can be based on various heuristics known in the art for evaluating relative workloads across distributed resources. For example, software available from VMware, Inc., known as Distributed Resource Scheduler, may be used to recommend VM candidates for storage migration.

In the embodiment of the invention illustrated herein, host computer system 100 selects VM 174 for migration from storage array 161 to storage array 162. After selection, host computer system 100 compares hash entries of hash index 171 that are associated with storage blocks of VM 174 with hash entries of hash index 172, and keeps track of the matching entries. A match indicates that a storage block with the same content is stored in storage array 162. Storage blocks of VM 174 that are not associated with matching entries are transferred as part of the migration. Storage blocks of VM 174 associated with matching entries are not transferred as part of the migration. In this manner, storage migration of a VM can be carried out without transferring all of the storage blocks of the VM.

In an alternative embodiment, transfer of storage blocks of VM 174 is started as soon as the decision to migrate the VM has been made. Thus, host computer system 100 transfers storage blocks of VM 174 to storage array 162 while it is searching for matching hash entries. This initial transfer of storage blocks of VM 174 is made without regard to whether or not blocks having the same content may be stored in storage array 162. Once matching entries have been found, remaining storage blocks of VM 174 that are not associated with matching entries are transferred, but remaining storage blocks of VM 174 that are associated with matching entries are not transferred.

In another embodiment where transfer of storage blocks of VM 174 is started as soon as the decision to migrate the VM has been made, Bloom filter 173 that is maintained for storage blocks of storage array 162 is used to identify the storage blocks of VM 174 that should be transferred initially. In this embodiment, host computer system 100 accesses Bloom filter 173 and performs a query on the Bloom filter for each storage block of VM 174 to find out whether content in that storage block is not stored in the set of storage blocks represented by Bloom filter 173. The query is carried out as follows: (1) content of the VM storage block is input into the hash functions associated with Bloom filter 173 to generate a number of bit array positions; (2) the bits of Bloom filter 173 at these bit array positions are checked; and (3) if at least one of these bits is not set to 1, then it is determined that the content of the VM storage block is not stored in the set of storage blocks represented by Bloom filter 173. Host computer system 100 then performs a transfer to the storage array 162 of the VM storage blocks whose content is not contained in the set of storage blocks represented by Bloom filter 173. While this initial transfer is ongoing, host computer system 100 searches for matching hash entries in the manner describe above. Once matching entries have been found, remaining storage blocks of VM 174 that are not associated with matching entries are transferred, but remaining storage blocks of VM 174 that are associated with matching entries are not transferred.

Figure 12:
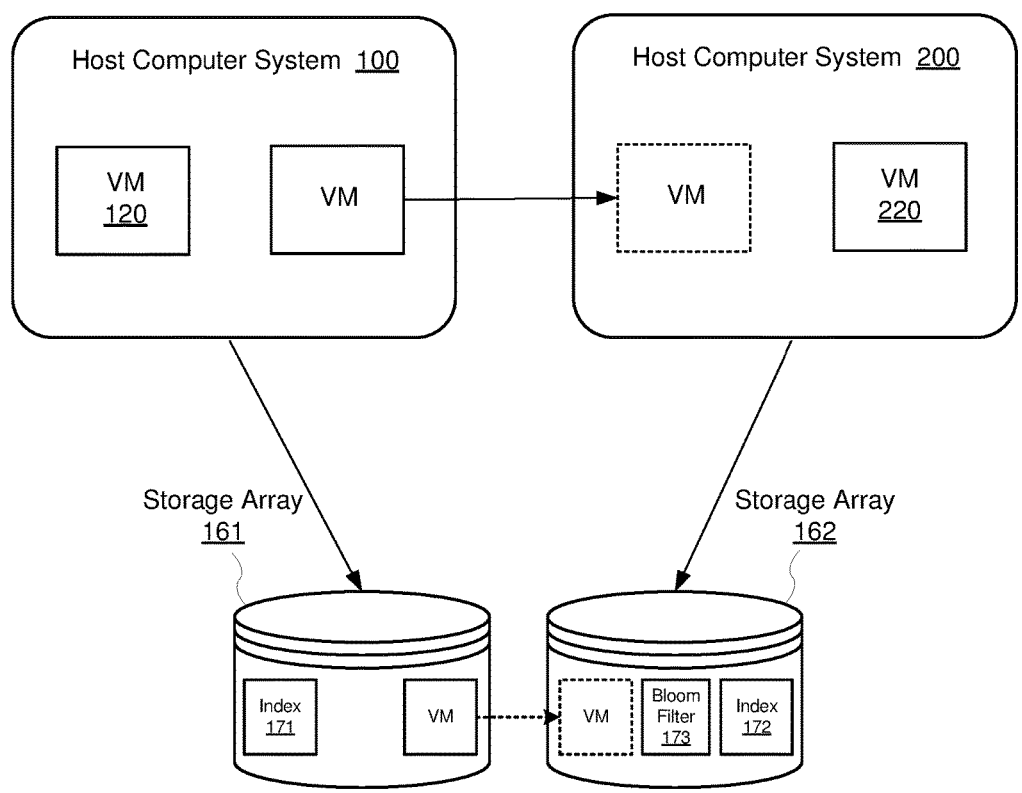
FIG. 12 is a schematic diagram of a multi-host system that carries out a migration of a virtual machine image from a source storage device to a destination storage device.

FIG. 12 is a schematic diagram of a multi-host system that carries out a migration of a virtual machine image from a source storage device to a destination storage device. Host computer system 100 is the same as described above in conjunction with FIG. 11 except data storage is served by storage array 161. Host computer system 200 has substantially the same configuration as host computer system 100 and has multiple VMs, VM 220, instantiated therein. Data storage for host computer system 200 is served by storage array 162. In the embodiment of FIG. 12, when VM 174 is migrated from storage array 161 to storage array 162, a VM instantiated in host computer system 100 is migrated to host computer system 200, as illustrated. The process of migrating running VMs can be performed, e.g., using a live migration software available from VMware, Inc. known as VMotion.

FIG. 13 is a flow chart of steps of a method of migrating a virtual machine image according to an embodiment of the invention. After a VM is selected for storage migration from a source storage device (e.g., storage array 161) to a destination storage device (e.g., storage array 162), the hash entries of the VM stored in a hash index maintained in the source storage device are read at step S102. At step S104, these hash entries are compared with hash entries of a hash index maintained in the destination storage device. The matching entries are identified at step S106. Step S108 is the data transfer step. At this step, only the storage blocks of the VM associated with the non-matching entries are transferred to the destination storage device. The storage blocks of the VM associated with the matching entries are not transferred to the destination storage device. Thus, less than all the storage blocks of the VM are transferred during the migration process described in steps S102 through S108.

In the embodiment of FIG. 11, host computer system 100 can access hash indices maintained in both the source storage device and the destination storage device. Therefore, in this embodiment, host computer system 100 performs all of steps S102 through S108. In the embodiment of FIG. 12, host computer system 100 sends the hash entries associated with the storage blocks of the VM to host computer system 200 and host computer system 200 performs steps S102 through S106. After step S106, the identity of the matching entries are communicated from host computer system 200 to host computer system 100 and, at step S108, host computer system 100 performs the data transfer step as described above.

FIG. 14 is a flow chart of steps of a method of migrating a virtual machine image according to another embodiment of the invention. Steps S112, S114, and S116 are performed in the same manner as steps S102, S104, and S106 of FIG. 13. In the embodiment of FIG. 14, however, step S110 is carried out in parallel with Steps S112, S114, and S116. At step S110, storage blocks of VM are transferred to the destination storage device without regard to whether or not they are stored in the destination storage device. The transfer of storage blocks pursuant to step S110 is terminated upon completion of step S116 and beginning of step S118. Step S118 is the data transfer step. At this step, of the remaining storage blocks of the VM that have not been transferred in step S110, only those storage blocks associated with the non-matching entries are transferred to the destination storage device; those storage blocks associated with the matching entries are not transferred to the destination storage device. Thus, again, less than all the storage blocks of the VM are transferred during the migration process described in steps S110 through S118.

In the embodiment of FIG. 11, host computer system 100 can access hash indices maintained in both the source storage device and the destination storage device. Therefore, in this embodiment, host computer system 100 performs all of steps S110 through S118. In the embodiment of FIG. 12, host computer system 100, while it is carrying out step S110, sends the hash entries associated with the storage blocks of the VM to host computer system 200 and host computer system 200 performs steps S112 through S116. After step S116, the identity of the matching entries are communicated to host computer system 100 and, at step S118, host computer system 100 performs the data transfer step as described above.

FIG. 15 is a flow chart of steps of a method of migrating a virtual machine image according to still another embodiment of the invention. Steps S122, S124, and S126 are performed in the same manner as steps S102, S104, and S106 of FIG. 13 and steps S112, S114, and S116 of FIG. 14. In the embodiment of FIG. 15, however, steps S119 through S121 are carried out in parallel with Steps S122, S124, and S126. At step S119, a Bloom filter that keeps track of storage blocks stored in the destination storage device is accessed. Then, at step S120, a query is performed on the Bloom filter for each storage block of the VM to find out whether content in that storage block is not contained in the set of storage blocks represented by the Bloom filter and thus not stored in the destination storage device. The storage blocks of VM that are not stored in the destination storage device, as determined using the Bloom filter in step S120, are transferred to the destination storage device at step S121. The transfer of storage blocks pursuant to step S121 is terminated upon completion of step S126 and beginning of step S128. Step S128 is the data transfer step. At this step, of the remaining storage blocks of the VM that have not been transferred in step S121, only those storage blocks associated with the non-matching entries are transferred to the destination storage device; those storage blocks associated with the matching entries are not transferred to the destination storage device. Thus, again, less than all the storage blocks of the VM are transferred during the migration process described in steps S119 through S128.

In the embodiment of FIG. 11, host computer system 100 can access hash indices maintained in both the source storage device and the destination storage device and the Bloom filter maintained in the destination storage device. Therefore, in this embodiment, host computer system 100 performs all of steps S119 through S128. In the embodiment of FIG. 12, host computer system 200 sends the Bloom filter to host computer system 100 and host computer system 100 sends the hash entries associated with the storage blocks of the VM to host computer system 200. While host computer system 100 performs steps S119 through S121, host computer system 200 performs steps S122 through S126. After step S126, the identity of the matching entries are communicated to host computer system 100 and, at step S128, host computer system 100 performs the data transfer step as described above.

Herein, a "hash" index is a file or other data structure that associates (directly or indirectly) hashes with the (present or past) storage-block locations of data blocks used to generate or that otherwise correspond to the hashes. Herein, a "shared-block file" or "pool file" (elsewhere referred to as an "arena") is a file with pointers that refer (directly or indirectly) to storage blocks that are know to be or have been shared by different locations within the same file and/or by different files. In the illustrated embodiment, a hash-index entry can refer indirectly to a shared storage block by referring directly to a pool-file location having an associated metadata block pointer that refers directly to the shared storage block.

In an alternative embodiment, each file with redirected file pointers has a corresponding hidden file that indicates which parts of the file are being shared and refer off to a special pool-like file. All reads and writes go through a filter layer that is aware of these hidden files. The combination of the underlying file system and this filter layer is functionally equivalent to the illustrated file system that supports pointer rewriting and COW. In effect, the filter system serves as a file system that uses another file system as its storage medium instead of using the disk directly. These and other variations upon and modifications to the illustrated embodiment are provided by the present invention, the scope of which is defined by the following claims.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript™, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows™, Apple Mac™, Unix/X-Windows™, Linux™, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

We claim:

1. A method of migrating an image of a virtual machine stored in a first storage system to a second storage system, said method being carried out by a host of the virtual machine, the host being connected to the first and second storage systems over a network, comprising:

retrieving entries of a first index that is stored in the first storage system and maintained for used storage blocks of the first storage system, wherein the used storage blocks of the first storage system include storage blocks of the virtual machine and the retrieved entries correspond to the storage blocks of the virtual machine;

comparing the retrieved entries with entries of a second index that is stored in the second storage system and maintained for used storage blocks of the second storage system; and initiating a migration process of the storage blocks of the virtual machine from the first storage system to the second storage system based on relative workloads of the first storage system and the second storage system, and carrying out the migration process based on the comparison of the retrieved entries with the entries of the second index, and wherein storage blocks of the first storage system corresponding to the retrieved entries that do not match entries of the second index are transferred to the second storage system, and storage blocks of the first storage system corresponding to the retrieved entries that match entries of the second index are not transferred to the second storage system.

2. The method of claim 1, further comprising:

identifying entries of the first index associated with the storage blocks of the virtual machine that match entries of the second index, wherein said migration process includes transferring the storage blocks of the virtual machine that are not associated with the identified entries and not transferring the storage blocks of the virtual machine that are associated with the identified entries.

3. The method of claim 1, further comprising:

identifying entries of the first index associated with the storage blocks of the virtual machine that match entries of the second index, wherein said migration process includes transferring a first set of storage blocks of the virtual machine prior to completion of said identifying and then transferring a second set of storage blocks of the virtual machine after completion of said identifying until completion of said migrating, and wherein the second set of storage blocks do not include the storage blocks of the virtual machine that are associated with the identified entries.

4. The method of claim 1, further comprising:

maintaining a Bloom filter for the entries in the second index;

using said Bloom filter, determining a set of storage blocks of the virtual machine that are not stored in the second storage system; and transferring the set of storage blocks of the virtual machine to the second storage system.

5. The method of claim 4, further comprising:

identifying entries of the first index associated with the storage blocks of the virtual machine that match entries of the second index, wherein said transferring is carried out prior to completion of said identifying.

6. The method of claim 1, wherein a computer system hosting the virtual machine has access to the first index and the second index.

7. The method of claim 1, wherein the first storage system is implemented on a first storage device and the second storage system is implemented on a second storage device that is physically separate from the first storage device.

8. A method of migrating an image of a virtual machine stored in a first storage system to a second storage system, said method being carried out by a host of the virtual machine, the host being connected to the first and second storage systems over a network, comprising:
  starting a migration process of the virtual machine from the first storage system to the second storage system based on relative workloads of the first storage system and the second storage system;
  identifying a set of blocks of the virtual machine that are not stored in the second storage system and are stored in the first storage system; and
  transferring the set of blocks from the first storage system to the second storage system, wherein storage blocks of the first storage system corresponding to entries of a first index in the first storage system that do not match entries of a second index in the second storage system are transferred to the second storage system, and storage blocks of the first storage system corresponding to the entries of the first index that match entries of the second index are not transferred to the second storage system.

9. The method of claim 8, further comprising:
  maintaining the first index in the first storage system, the first index including entries representing contents of storage blocks of the virtual machine; and
  maintaining the second index in the second storage system, the second index including entries representing contents of storage blocks stored in the second storage system, wherein said identifying includes comparing the entries in the first index with the entries in the second index.

10. The method of claim 8, further comprising:
  maintaining a Bloom filter for storage blocks stored in the second storage system, wherein the set of blocks of the virtual machine that are not stored in the second storage system is identified using said Bloom filter.

11. The method of claim 10, wherein the Bloom filter is maintained by the second storage system and updated each time new content is written into storage blocks of the second storage system.

12. The method of claim 11, further comprising:
  identifying another set of blocks of the virtual machine that are not stored in the second storage system during the migration process; and
  transferring said another set of blocks of the virtual machine from the first storage system to the second storage system during the migration process.

13. A computer system comprising:
  a host computer for a virtual machine;
  a source storage device having an image of the virtual machine stored therein and including a first index; and
  a destination storage device that is physically separate from the source storage device to which the image of the virtual machine is to be migrated, wherein the destination storage device includes a second index, wherein the host computer is connected to the source storage device and the destination storage device over a network and is programmed to:
  initiate a migration process for the virtual machine based on relative workloads of the source storage device and the destination storage device, and compare entries associated with the virtual machine stored in the first index with entries of the second index,
  identify matching entries, and
  transfer those storage blocks of the virtual machine stored in the source storage device associated with the non-matching entries to the destination storage device, and not transfer those storage blocks of the virtual machine stored in the source storage device associated with matching entries to the destination storage device.

14. The computer system of claim 13, further comprising:
  another host computer coupled to the destination storage device and configured to run the virtual machine after the migration process, wherein said another host computer is programmed to determine the subset of the storage blocks of the virtual machine to be transferred.

15. The computer system of claim 14,
  wherein the source storage device includes a first index and the destination storage device includes a second index, and
  wherein said another host computer is programmed to compare entries associated with the virtual machine stored in the first index with entries of the second index, identify matching entries, and communicate the matching entries to the host computer.

16. The computer system of claim 13, wherein the destination storage device includes a Bloom filter that is updated as new content is written into storage blocks of the destination storage device, and the subset of the storage blocks of the virtual machine to be transferred is identified using the Bloom filter.

17. The method of claim 1,
  wherein the first index is maintained prior to the migration process by a first host and a second host to cooperatively implement deduplication in the first storage system, and
  wherein the first host and the second host are prevented from concurrently accessing the same storage blocks of the first storage system.

18. The method of claim 1, wherein, before said migration process, data storage for the virtual machine is provided by the first storage system, and after said migration process, data storage for the virtual machine is provided by the second storage system.

19. The method of claim 1, wherein the migrated image of the virtual machine on the second storage system comprises portions of a pool file having metadata block pointers referring to storage blocks of the second storage system corresponding to the matching entries of the second index.

* * * * *